(12) United States Patent
Cheung et al.

(10) Patent No.: US 11,630,334 B2
(45) Date of Patent: Apr. 18, 2023

(54) OPTICAL COUPLER

(71) Applicant: Hewlett Packard Enterprise Development LP, Houston, TX (US)

(72) Inventors: Stanley Cheung, Milpitas, CA (US); Di Liang, Santa Barbara, CA (US); Sudharsanan Srinivasan, Santa Barbara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 254 days.

(21) Appl. No.: 16/948,579

(22) Filed: Sep. 24, 2020

(65) Prior Publication Data

US 2022/0091446 A1    Mar. 24, 2022

(51) Int. Cl.
 *G02F 1/025* (2006.01)
 *G02F 1/313* (2006.01)
(52) U.S. Cl.
 CPC ............ *G02F 1/025* (2013.01); *G02F 1/3133* (2013.01)
(58) Field of Classification Search
 CPC ......... G02F 1/025; G02F 1/3133; G02F 1/035
 USPC ................................................ 385/1–4, 8, 9
 See application file for complete search history.

(56) References Cited

U.S. PATENT DOCUMENTS

| | | | | |
|---|---|---|---|---|
| 5,004,447 A | * | 4/1991 | Soref ..................... | G02F 1/3133 257/14 |
| 5,066,086 A | * | 11/1991 | Angenent ............. | G02F 1/3133 385/41 |
| 8,362,494 B2 | | 1/2013 | Lo et al. | |
| 9,036,953 B2 | | 5/2015 | Witzens et al. | |
| 9,612,503 B2 | | 4/2017 | Liang | |

(Continued)

FOREIGN PATENT DOCUMENTS

| | | | | |
|---|---|---|---|---|
| JP | 64-40813 | * | 2/1989 | ............ G02F 1/015 |
| JP | 5-107568 | * | 4/1993 | ............ G02F 1/313 |
| JP | 5-158081 | * | 6/1993 | ............ G02F 1/313 |

OTHER PUBLICATIONS

Goldshtein et al., Fine resolution photonic spectral processor using a waveguide grating router with permanent phase trimming, Journal of Lightwave Technology, vol. 34, No. 2, Jan. 15, 2016, pp. 379-385.

(Continued)

*Primary Examiner* — Robert Tavlykaev
(74) *Attorney, Agent, or Firm* — Sheppard Mullin Richter & Hampton LLP

(57) ABSTRACT

Examples described herein relate to an optical coupler. The optical coupler may include a first optical waveguide base layer, a second optical waveguide base layer, an insulating layer disposed over at least a portion of both the first optical waveguide base layer and the second optical waveguide base layer, and a semiconductor material layer disposed over the insulating layer. Overlapping portions of the first optical waveguide base layer, the insulating layer, and the semiconductor material layer form a first optical waveguide, and overlapping portions of the second optical waveguide base layer, the insulating layer, and the semiconductor material layer form a second optical waveguide. Moreover, the optical coupler may include a plurality of metal contacts to receive one or more first biasing voltages to operate one of the first optical waveguide base layer and the second optical waveguide base layer in an accumulation mode.

20 Claims, 6 Drawing Sheets

(56) References Cited

U.S. PATENT DOCUMENTS

| | | | | |
|---|---|---|---|---|
| 2004/0081389 A1* | 4/2004 | Soda | ............. | G02F 1/3133 385/16 |
| 2007/0201784 A1* | 8/2007 | Kissa | ............. | G02F 1/3132 385/9 |
| 2015/0055910 A1* | 2/2015 | Liang | ............. | G02F 1/025 385/2 |
| 2017/0255079 A1* | 9/2017 | Jiang | ............. | G02F 1/3138 |

OTHER PUBLICATIONS

Guo et al., "A laser trimming assist wavelength alignment technique for silicon microdonut resonators", IEEE Photonics Technology Letters, vol. 29, No. 5, Mar. 1, 2017, pp. 419-422.

Hiraki et al., "Heterogeneously integrated III-V/Si MOS capacitor Mach-Zehnder modulator", Nature Photonics, vol. 11, Jul. 17, 2017, pp. 1-5.

Llewellyn et al., "Chip to chip quantum teleportation and multi-photon entanglement in silicon", Nature Physics, Feb. 9, 2020, 48 pages.

Marpaung et al., "Integrated microwave photonics", Nature Photonics, vol. 13, Feb. 2019, pp. 80-90.

Pal et al., "Novel Optical Modulator Using Junction-less Metal Gate MOS Phase Shifter on SOI Platform", IEEE, Nov. 2-3, 2017, 4 pages.

Perez et al., "Field-programmable photonic arrays", Optics express, vol. 26 (21), Oct. 15, 2018, pp. 27265-27278.

Perez et al., "Multipurpose silicon photonics signal processor core", Nature communications, vol. 8 (1), Sep. 21, 2017, pp. 1-9.

Takeda et al., "Toward large scale fault tolerant universal photonic quantum computing", APL Photonics 4, 060902, Jun. 13, 2019, pp. 060902-1-060902-13.

Takenaka et al., "III-V/Si Hybrid MOS Optical Phase Shifter for Si Photonic Integrated Circuits", Journal of Lightwave Technology, vol. 37, No. 5, Mar. 1, 2019, pp. 1474-1483.

Zauner et al., "UV trimming of arrayed-waveguide grating wavelength division demultipleers", Electronics Letters, vol. 34, No. 8, Apr. 16, 1998, 2 pages.

* cited by examiner

OPTICAL COUPLER

STATEMENT OF GOVERNMENT RIGHTS

This invention was made with Government support under DE-AR0001039 awarded by DOE, Office of ARPA-E. The Government has certain rights in this invention.

BACKGROUND

An optical communication system generally provides communication over longer distances with higher bandwidth using smaller cable width (or diameter) in comparison to communication systems using electrical wires. In the optical communication system, a light generated by a light source (e.g., a laser) may be communicated from a first optical device to a second optical device via fiber optic cables.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
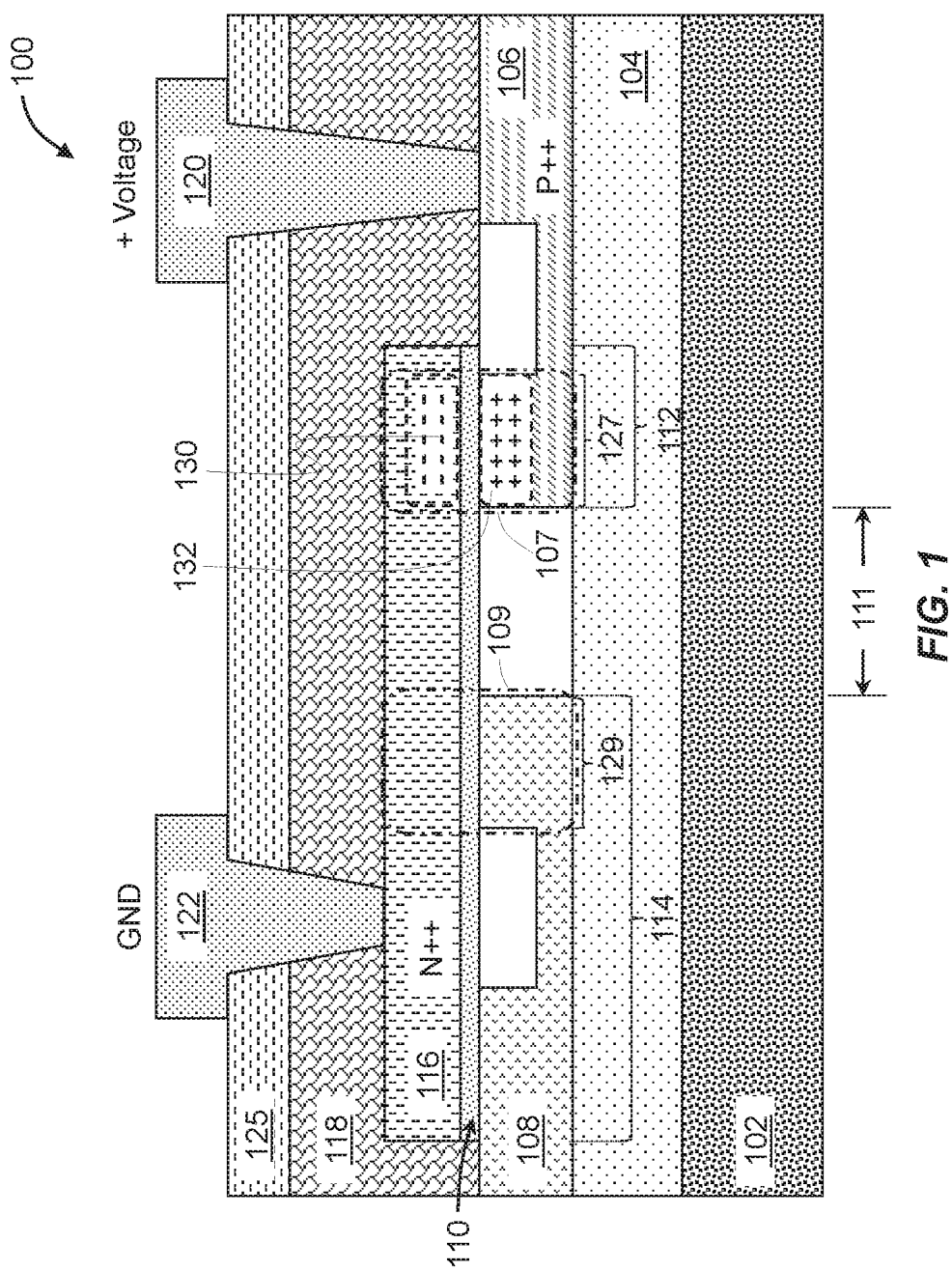
FIG. 1 depicts a diagrammatic representation of a cross-sectional view of an optical coupler, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. Further, the term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. Further, the term "disposed in contact" as used herein may refer to placement of two materials that can allow flow of electricity via a coupled combination of the two materials when a potential difference is applied across the coupled combination of the two materials. In one example, the two materials may be disposed in contact with each other by causing a direct/physical contact between the two materials. In some other examples, the two materials may be disposed in contact with each other by disposing another material that is capable of conducting electricity between the two materials.

An optical communication system generally provides communication over longer distances with higher bandwidth using smaller cable width (or diameter) in comparison to communication systems using electrical wires. In the optical communication system, a light generated by a light source (e.g., a laser) may be communicated from a first optical device to a second optical device via one or more fiber optic cables. An optical device, for example, an optical coupler may be disposed in the optical communication system for connecting one or more ends of fiber optic cables in order to allow the transmission of light waves in multiple paths. The optical coupler may be operated as an optical switch, an optical splitter, or an optical combiner. Typically, the optical couplers may be employed in several applications including, but not limited to, reprogrammable photonics circuits, photonic processors, quantum computing, radio-frequency (RF) photonics, photonic integrated circuits, such as, lattice filters, Dense Wavelength Division Multiplexing (DWDM) circuits, Coarse Wavelength Division Multiplexing (CWDM) circuits, ring resonators, Mach-Zehnder interferometers (MZI), arrayed waveguide gratings (AWGs), Sagnac loop mirrors, and wavelength stabilizers, and the like. In the one or more of these, the optical coupler may cause a coupling effect enabling one or more of switching, combining, or splitting of the light in respective optical circuits.

In some examples, the coupling effect of the optical coupler may be impacted because of any imperfections in a structure of the optical coupler caused during its fabrication process. Consequently, the optical coupler, when employed in the optical communication system, may not accurately perform switching, combining, and/or splitting of the light. As such, these imperfections in the structure of the optical coupler are difficult to cure after the optical coupler is manufactured. Furthermore, in some examples, optical devices such as the optical couplers may be used with heating elements, for example, metal heaters or doped-silicon heaters, that aid in tuning the operation of the optical couplers. Use of such heating elements may increase power consumption by the optical communication system.

To that end, in accordance with aspects of the present application, an optical coupler is provided which can compensate for any degradation in the coupling effect caused due to imperfections occurred during the fabrication process and capable of being operated without using the heating elements thereby reducing power commotion. In some examples, the optical coupler may include a first optical waveguide base layer and a second optical waveguide base layer. At least one of the first optical waveguide base layer and the second optical waveguide base layer may include a first-type doping. Further, the optical coupler may include an insulating layer disposed over at least a portion of both the first optical waveguide base layer and the second optical waveguide base layer. Furthermore, the optical coupler may include semiconductor material layer disposed over the insulating layer. In some examples, overlapping portions of the first optical waveguide base layer, the insulating layer, and the semiconductor material layer may form a first optical waveguide. Further, overlapping portions of the second optical waveguide base layer, the insulating layer, and the semiconductor material layer may form a second optical waveguide. Moreover, the optical coupler may include a plurality of metal contacts disposed in contact with the semiconductor material layer and at least one of the first optical waveguide base layer and the second optical waveguide base layer to receive one or more first biasing voltages to operate one of the first optical waveguide and the second optical waveguide in an accumulation mode.

As will be appreciated, biasing voltages applied to the metal contacts of the optical coupler are used to tune the refractive index of one or both of the first optical waveguide and the second optical waveguide. For example, when the first optical waveguide operated in the accumulation mode, free charge carriers in the first optical waveguide are accumulated near the insulating layer in the first optical waveguide. The accumulation of the free charge carriers in the first optical waveguide may alter (e.g., decrease) the refractive index of the first optical waveguide. Due to the decrease in the refractive index, a wavelength of the light in the first optical waveguide decreases which may cause a blue-shift in the light. Accordingly, a light passing through the second optical waveguide may be attracted toward the first optical waveguide and may enter into the first optical waveguide. The accumulation of the free charge carriers in the first optical waveguide, and hence the refractive index of the first optical waveguide, may be controlled by varying the voltages applied to the metal contacts. Consequently, coupling of light from the second optical waveguide to the first optical waveguide may also be controlled/tuned based on the voltages applied to the metal contacts. Such an electrical tuning of the refractive index may compensate for any imperfections caused during the fabrication of the optical coupler and to achieve a predetermined coupling. Also, as the tuning of the refractive index is provided by operating the optical waveguide in the accumulation mode, the proposed optical coupler may work without the heating elements thereby reducing power consumption.

Referring now to the drawings, in FIG. 1, a diagrammatic representation of a cross-sectional view of an optical coupler 100 is depicted, in accordance with an example. The optical coupler 100 may be disposed in an optical communication system (not shown). Typically, the optical communication system includes a network of fiber optic cables that acts as a medium for transmission of light from one point to another point. The optical coupler 100 may be employed in the optical communication system for connecting one or more ends of the fiber optic cables in order to allow the transmission of light waves in multiple paths. The optical coupler 100 may have a plurality of ports (not shown in FIG. 1) including one or more input ports and one or more output ports. In one example, the optical coupler 100 may be used as an optical switch where a light signal may be transferred from an input port to one of the output ports. In another example, the optical coupler 100 may be used as an optical splitter where the light signal may be transferred from the input port to a plurality of the output ports in a predetermined proportion. In yet another example, the optical coupler 100 may be used as an optical combiner where light signals from a plurality of input ports may be combined into a single output port.

The optical coupler 100 may be a semiconductor based device and may be formed on a substrate 102 made of one or more semiconductor materials including, but not limited to, Silicon (Si), Indium phosphide (InP), Germanium (Ge), Gallium Arsenide (GaAs), Silicon Carbide (SiC), or combinations thereof. For illustration purposes, the substrate 102 is described as being a Silicon substrate. Further, in some examples, the optical coupler 100 may include a first insulating layer 104 disposed over the substrate 102. The first insulating layer 104 may be formed by oxidizing the substrate 102. In the ongoing example, for the substrate 102 made of Silicon, the first insulating layer 104 may be silicon-dioxide ($SiO_2$) that may be formed in the presence of oxygen at a temperature in the range 900° C. to 1300° C. In some examples, the first insulating layer 104 may be a buried oxide layer that is the silicon-dioxide may be buried in the substrate 102. In some examples, a layer of the silicon-dioxide acting as the first insulating layer 104 may be buried in the substrate 102 at a depth ranging from less than 100 nm to several micrometers from the wafer surface depending on application.

Further, in some examples, the optical coupler 100 may include pair of optical waveguide base layers including a first optical waveguide base layer 106 and a second optical waveguide base layer 108. The first optical waveguide base layer 106 and the second optical waveguide base layer 108 may be disposed adjacent to each other with a first predetermined gap 111 there-between. By way of example, the first optical waveguide base layer 106 and the second first optical waveguide base layer 108 may be disposed at the first predefined gap 111 from each other over a first length and at a second predefined gap from each other over a second length (see FIG. 2, described later).

The first optical waveguide base layer 106 and the second optical waveguide base layer 108 may be formed using a semiconductor material including, but not limited to, Si, InP, Ge, GaAs, SiC, or combinations thereof. Further, at least one of the first optical waveguide base layer 106 and the second optical waveguide base layer 108 may include a first-type doping. In the example of FIG. 1, the first optical waveguide base layer 106 may include the first-type doping and the second optical waveguide base layer 108 may be un-doped. In certain other examples, the first optical waveguide base layer 106 may include the first-type doping and the second optical waveguide base layer 108 may include a second-type doping (e.g., FIG. 3). In some examples, both the first optical waveguide base layer 106 and the second optical waveguide base layer 108 may include the first-type doping (see FIG. 4). In some other examples, both the first optical waveguide base layer 106 and the second optical waveguide base layer 108 may include the second-type doping (see FIG. 5). In some examples and for illustration purposes in the rest of the description, the first-type doping is described as being a p-type doping and the second-type doping is described as being an n-type doping. Alternatively, in certain other examples, the first-type doping may be the n-type doping and the second-type doping may be the p-type doping. For illustration purposes, in FIG. 1, the first optical waveguide base layer 106 is shown to include the first-type (i.e., p-type) doping and the second optical waveguide base layer 108 is shown un-doped.

N-type doping in any of the first optical waveguide base layer 106 and the second optical waveguide base layer 108 may be achieved by doping the respective semiconductor material with impurities having donor ions including, but not limited to, Phosphorus (P), Arsenic (As), Antimony (Sb), or Bismuth (Bi). Accordingly, the semiconductor material with the n-type doping may have electrons in excess of holes. In the semiconductor material with the n-type doping, the electrons that are in excess of the holes are also referred to as free electrons which act as free charge carriers. P-type doping in any of the first optical waveguide base layer 106 and the second optical waveguide base layer 108 may be achieved by doping the respective semiconductor material with impurities having acceptor ions including, but not limited to, Boron (B), Gallium (Ga), Indium (In), or Aluminum (Al). Accordingly, the semiconductor material with the p-type doping may have holes in excess of electrons. In the semiconductor material with the p-type doping, the holes that are in excess of the electrons are also referred to as free holes which act as free charge carriers. The n-type doping or the p-type doping may be achieved by using techniques such as impurity diffusion, ion implantation, in-situ doping, and the like. In the description hereinafter, the term "free charge carriers" may represent the free electrons with reference to the semiconductor material when having the n-type doping. Further, the term "free charge carriers" may represent the free holes with reference to the semiconductor material when having the p-type doping.

Further, in some examples, the optical coupler 100 may include a second insulating layer 110. The second insulating layer 110 may be disposed over at least a portion of both the first optical waveguide base layer 106 and the second optical waveguide base layer 108. For example, as depicted in FIG. 1, the second insulating layer 110 may be formed over the portions 112 and 114 of the first optical waveguide base layer 106 and the second optical waveguide base layer 108, respectively. The second insulating layer 110 may include one or more of $SiO_2$, Silicon Nitride ($Si_3N_4$), Aluminum oxide ($Al_2O_3$), Hafnium Dioxide ($HfO_2$), and the like. The second insulating layer 110 may be deposited or thermally grown on the portions 112, 114. In certain other examples, the second insulating layer 110 may be formed as a buried layer in the portions 112, 114 of the first optical waveguide base layer 106 and the second optical waveguide base layer 108, respectively.

Moreover, in some examples, the optical coupler 100 may include a semiconductor material layer 116 disposed over the second insulating layer 110. The semiconductor material layer 116 may include a semiconductor material, including but not limited to, Si, Ge, GaAs, InP, and the like. For illustration purposes, in the description hereinafter, the semiconductor material layer 116 is described as being a layer of GaAs. Further, in some examples, the semiconductor material layer 116 may be doped to have free charge carriers. In some examples, semiconductor material layer 116 may include any of the first-type or the second-type doping. In certain examples, the semiconductor material layer 116 may be doped to have different type of doping in comparison to the first optical waveguide base layer 106. By way of example, if the first optical waveguide base layer 106 includes the first-type doping, the semiconductor material layer 116 may include the second-type doping, or vice-versa. In the example of FIG. 1, the first optical waveguide base layer 106 includes the p-type doping and the semiconductor material layer 116 includes the n-type doping.

Additionally in some examples, the optical coupler 100 may include a third insulating layer 118. The third insulating layer 118 may be disposed over the semiconductor material layer 116 and rest of the surface of the first optical waveguide base layer 106 and the second optical waveguide base layer 108. The third insulating layer 118 may be one example of the second insulating layer 110 which may include one or more of $SiO_2$, $Al_2O_3$, $HfO_2$, $Si_3N_4$, polyimide, or benzocyclobutene (BCB).

Furthermore, in some examples, the optical coupler 100 may include a plurality of metal contacts, such as, a first metal contact 120 and the second metal contact 122, disposed in contact with the semiconductor material layer 116 and at least one of the first optical waveguide base layer 106 and the second optical waveguide base layer 108. The first metal contact 120 and the second metal contact 122 are hereinafter collectively referred to as metal contacts 120, 122. To form the first metal contact 120, the third insulating layer 118 may be etched or lithographically defined to form a first via until the first optical waveguide base layer 106 is reached. Similarly, to form the second metal contact 122, the third insulating layer 118 may be etched or lithographically defined to form a second via until the second optical waveguide base layer 108 is reached. Once the first via and second via are formed, a conducting material (e.g., metal) is deposited/filled into the first via and second via to form the metal contacts 120 and 122, respectively. Moreover, once the metal contacts 120, 122 are formed, a bonding layer 125 may be formed on the third insulating layer 118 by masking the metal contacts 120, 122 so that the metal contacts 120, 122 remain exposed for external connections and the third insulating layer 118 may be encapsulated by the bonding layer 125. The bonding layer 125 may include materials including, but not limited to, BCB, SU-8, $SiO_2$, or $Si_3N_4$, and the like. Alternatively, in some examples, the contacts 120, 122 may be formed after the bonding layer 125 is disposed over the third insulating layer 118.

Further, overlapping portions of a given optical waveguide base layer, the second insulating layer 110, and the semiconductor material layer 116 may define a hybrid optical waveguide. For example, as shown in FIG. 1, the portion 127 of the first optical waveguide base layer 106 and portions of the second insulating layer 110 and the semiconductor material layer 116 that are located over and overlap with the portion 127 of the first optical waveguide base layer 106 form a hybrid optical waveguide, hereinafter referred to as a first optical waveguide 107. Similarly, as depicted in FIG. 1, the portion 129 of the second optical waveguide base layer 108 and portions of the second insulating layer 110 and the semiconductor material layer 116 that are located over and overlap with the portion 129 of the second optical waveguide base layer 108 form another hybrid optical waveguide, hereinafter referred to as a second optical waveguide 109.

The first metal contact 120 in connection with the semiconductor material layer 116 disposed over the second insulating layer 110 may cause the first optical waveguide 107 to act like a metal-oxide-semiconductor (MOS) capacitor in the optical coupler 100, in some examples. During operation of the optical coupler 100, in one example, a light may be passed through the second optical waveguide 109. Further, biasing voltages may be applied to the metal contacts 120, 122 to operate the first optical waveguide 107 in an accumulation mode. The biasing voltages may be applied from any voltage source (e.g., battery or a power supply).

For example, when a positive voltage is applied to the first metal contact 120 in comparison to the voltage on the second metal contact 122, the free charge carriers, e.g., free electrons, in the semiconductor material layer 116 having the n-type doping may be accumulated in a region 130 of the semiconductor material layer 116. The region 130 is located over the portion 127 of the first optical waveguide base layer 106. Further, the free charge carriers, e.g., free holes, in the first optical waveguide base layer 106 may get accumulated in a region 132 in the first optical waveguide base layer 106. Accordingly, when the positive voltage is applied to the first metal contact 120 and the ground (or negative) voltage is applied to the second metal contact 122, the free charge carriers get accumulated (e.g., at least in the regions 10, 132) in the first optical waveguide 107. The operation of the first optical waveguide 107 under the application of the voltages at the contact terminals 120, 122 such that the free charge carriers are accumulated on either side of the second insulating layer 110 (e.g., in regions 130 and 132) in the first optical waveguide 107 is hereinafter referred to as the accumulation mode.

It may be noted that the terms "positive voltage" and the "negative voltage" are relative voltages. In other words, a given metal contact of the two metal contacts 120, 122 is said to be at the positive voltage when a potential at the given metal contact is greater than a potential at the other metal contact of the two metal contacts 120, 122. Similarly, the given metal contact of two metal contacts 120, 122 is said to be at the negative voltage when the potential at the given metal contact is lower than the potential at the other metal contact of the two metal contacts 120, 122. Further, the regions 130 and 132 as marked in FIG. 1 are for illustration purposes. As will be understood, volumes occupied by the regions 130 and 132 may depend on doping concentration in respective materials and/or magnitudes of the voltages applied to the metal contacts 120, 122.

Accumulation of the free charge carriers in the first optical waveguide 107 (e.g., accumulation of the free holes in the region 132 and the free electrons in the region 130) may cause a change in material properties of the first optical waveguide 107. For example, the accumulation of free charge carriers in the first optical waveguide 107 may cause a change in a refractive index of the first optical waveguide 107. In particular, such accumulation of the free charge carriers may decrease the refractive index of the first optical waveguide 107. Due to the decrease in the refractive index, a wavelength of the light in the first optical waveguide 107 decreases which may cause a blue-shift in the light. Accordingly, a light passing through the second optical waveguide 109 may be attracted toward the first optical waveguide 107 and may enter into the first optical waveguide 107. The accumulation of the free charge carriers in the regions 130, 132 of the first optical waveguide 107, and hence the refractive index of the first optical waveguide 107, may be controlled by varying the voltages applied to the metal contacts 120, 122. Consequently, coupling of light from the second optical waveguide 109 to the first optical waveguide 107 may also be controlled based on the voltages applied to the metal contacts 120, 122. As a result, in some examples, coupling of light or a coupling efficiency from the second optical waveguide base layer to the first optical waveguide base layer may be increased by controlling the voltages applied to the metal contacts 120, 122.

Figure 2:
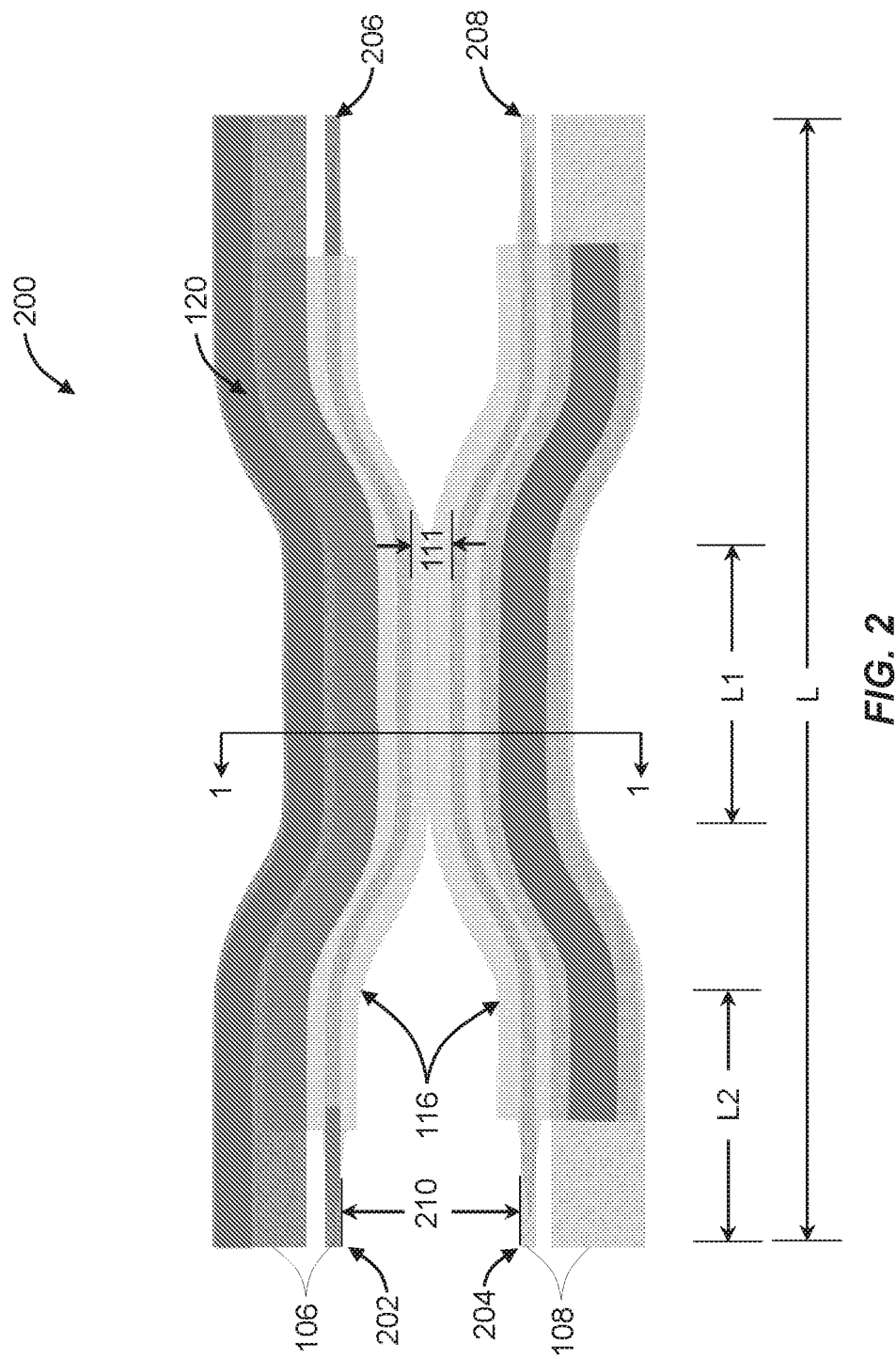
FIG. 2 depicts a diagrammatic representation of a top view of the optical coupler of FIG. 1, in accordance with an example.

Referring now to FIG. 2, a diagrammatic representation of a top view 200 of the optical coupler 100 of FIG. 1 is depicted, in accordance with an example. For ease of illustration, not all the layers shown in FIG. 1 are depicted in the top view 200 of FIG. 2. For example, the top view 200 depicts the first optical waveguide base layer 106, the second optical waveguide base layer 108, the semiconductor material layer 116, and the metal contacts 120, 122. Further, for illustration purposes, the optical coupler 100 is shown to have a length L. As depicted in FIG. 2, the optical coupler 100 may include a plurality of ports, for example, ports 202, 204, 206, and 208. Any of the ports 202, 204, 206, and 208 may act as input ports or output ports. For illustration purposes, the port 204 is described as being an input port and the rest of the ports are described as being output ports. By way of example, if the optical coupler 100 is to be operated as a switch, a light entering from the port 204 may be switched to the output port 206.

Further, as depicted in FIG. 2, the first optical waveguide base layer 106 and the second first optical waveguide base layer 108 are disposed at the first predefined gap 111 from each other over a first length L1 and at a second predefined gap 210 from each other over a second length L2. The cross-sectional view shown in FIG. 1, may represent a cross-section of the optical coupler 100 at any location along the length L1, for example, at the location 1-1 depicted in FIG. 2. In some examples, although not shown in the top-view 200, to further enhance the light coupling effect caused by operating the first optical waveguide 107 in the accumulation mode, a width of the first optical waveguide base layer 106 and the second optical waveguide base layer 108 may be varied along the length L of the optical coupler 100.

Figure 3:
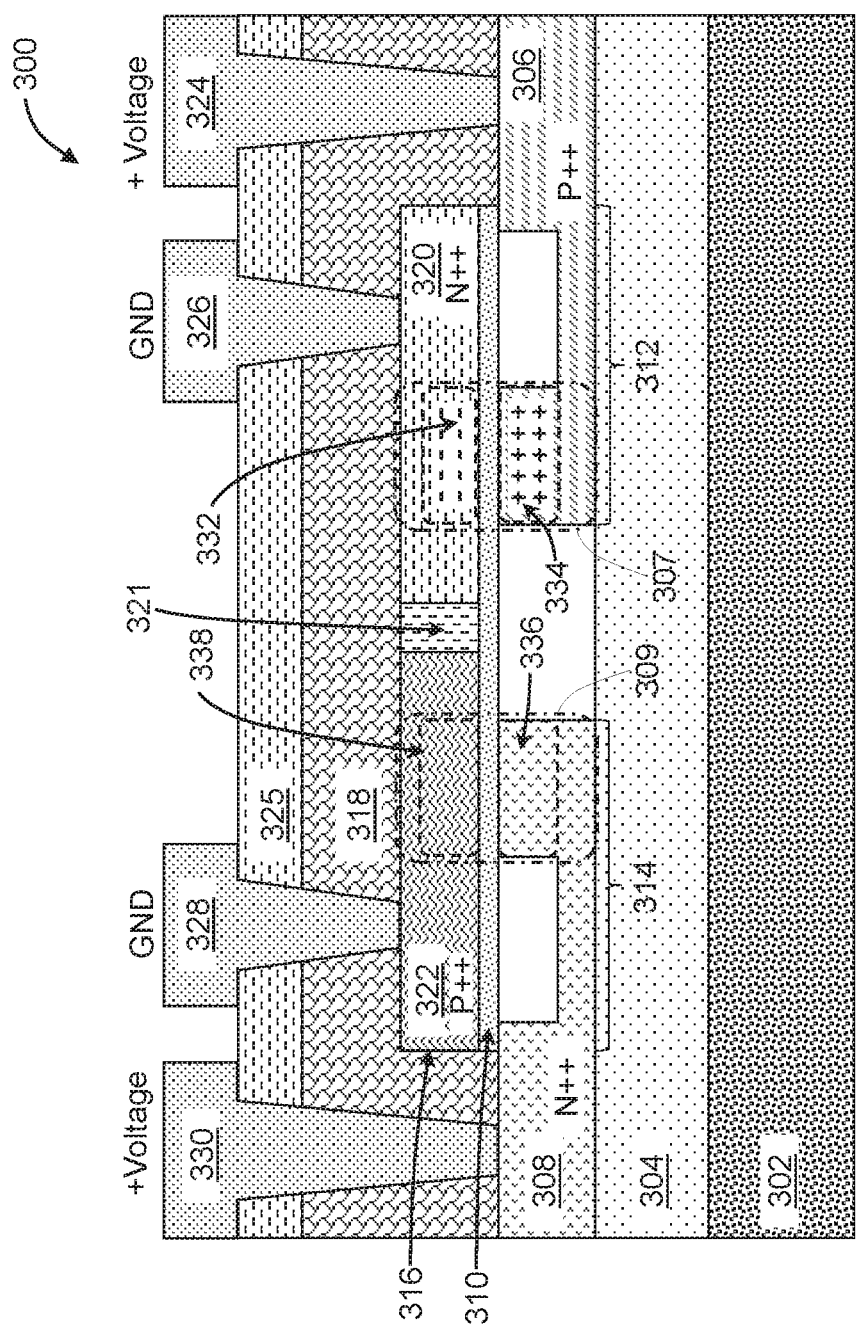
FIG. 3 depicts a diagrammatic representation of a cross-sectional view of an optical coupler, in accordance with another example.

Referring now to FIG. 3, a diagrammatic representation of a cross-sectional view of an optical coupler 300 is depicted, in accordance with another example. The optical coupler 300 of FIG. 3 may be representative of one example of the optical coupler 100 of FIG. 1 and includes certain material layers that are similar or identical to the ones described in FIG. 1, description of which is not repeated herein. For example, the optical coupler 300 also includes a substrate 302, a first insulating layer 304, a first optical waveguide base layer 306, a second optical waveguide base layer 308, a second insulating layer 310, a semiconductor material layer 316, a third insulating layer 318, and a bonding layer 325 that may represent examples of the substrate 102, the first insulating layer 104, the first optical waveguide base layer 106, the second optical waveguide base layer 108, the second insulating layer 110, the semiconductor material layer 116, the third insulating layer 118, and the bonding layer 125, respectively, of the optical coupler 100 of FIG. 1.

In the example of FIG. 3, the first optical waveguide base layer 306 is doped to have the first-type (e.g., p-type) doping and the second optical waveguide base layer 308 is doped to have the second-type (e.g., n-type) doping. Further, the semiconductor material layer 316 may include two different types of doping in separate portions thereof. For example, the semiconductor material layer 316 may include portions, such as a first portion 320 and a second portion 322. The first portion 320 may be located over a portion 312 of the first optical waveguide base layer 306 and the second portion 322 may be located over a portion 314 of the second optical waveguide base layer 308. In some examples, the first portion 320 of the semiconductor material layer 316 may be doped to include the second-type doping and the second portion 322 of the semiconductor material layer 316 may be doped to include the first-type doping. For example, as depicted in FIG. 3, the portion 320 of the semiconductor material layer 316 is shown to include the n-type doping and the portion 322 of the semiconductor material layer 316 is shown to include the p-type doping. In some examples, as depicted in FIG. 3, the semiconductor material layer 316 may include a portion 321 located between the first portion 320 and the second portion 322. In some examples, the portion 321 may be un-doped and does not contain free charge carriers. However, in certain examples, the portion 321 may be an insulating region that electrically insulates the first portion 320 from the second portion 322.

Further, the reference numerals 307 and 309 respectively represent a first optical waveguide and a second optical waveguide. For example, in a similar fashion as described with reference to FIG. 1, the first optical waveguide 307 is defined by the overlapping portions of the first optical waveguide base layer 306, the second insulating layer 310, and the semiconductor material layer 316. Similarly, the second optical waveguide 309 is defined by the overlapping portions of the second optical waveguide base layer 308, the second insulating layer 310, and the semiconductor material layer 316, as depicted in FIG. 3.

Furthermore, the optical coupler 300 may include additional metal contacts in comparison to the optical coupler 100 of FIG. 1. For example, the optical coupler 300 may include a plurality of metal contacts, such as, a first metal contact 324, a second metal contact 326, a third metal contact 328, and the fourth metal contact 330, hereinafter collectively referred to as metal contacts 324-330. As depicted in FIG. 3, the first metal contact 324 may be disposed in contact with the first optical waveguide base layer 306. Further, the second metal contact 326 may be disposed in contact with the first portion 320 of the semiconductor material layer 316. Furthermore, the third metal contact 328 may be disposed in contact with the second portion 322 of the semiconductor material layer 316. Moreover, the fourth metal contact 330 may be disposed in contact with the second optical waveguide base layer 308. The metal contacts 324-330 may be formed by forming vias in the third insulating layer 318 at the respective places and filling the vias with metal.

During operation, the first optical waveguide 307 and the second optical waveguide 309 may be operated in various combinations of the accumulation mode and the depletion mode. For example, while the first optical waveguide 307 may be operated in the accumulation mode, the second optical waveguide 309 may not be biased thereby achieving light coupling in a similar fashion as described in FIG. 1. Further, in another example, while the second optical waveguide 309 may be operated in the depletion mode, the first optical waveguide 307 may not be biased. Moreover, in yet another example, while the first optical waveguide 307 may be operated in the accumulation mode, the second optical waveguide 309 may be operated in the depletion mode.

In some examples, the first optical waveguide 307 may be operated in the accumulation mode by applying the one or more first biasing voltages to the first metal contact 324 and the second metal contact 326 such that the free charge carriers in the first portion 320 and the free charge carriers in the first optical waveguide base layer 306 are accumulated in the first optical waveguide 307 adjacent to a boundary between the first portion 320 of the semiconductor material layer 316 and the first optical waveguide base layer 306. By way of example, in the optical coupler 300 of FIG. 3, the first optical waveguide 307 may be operated in the accumulation mode by applying a positive voltage to the first metal contact 324 and applying a negative voltage to the second metal contact 326 or grounding the second metal contact 326. Consequently, the free charge carriers, e.g., the free electrons in the first portion 320 of the semiconductor material layer 316 may be accumulated in a region 332 of the first optical waveguide 307. In particular, the region 332 is a portion of the semiconductor material layer 316 that forms a part of the first optical waveguide 307. Further, the free charge carriers, e.g., free holes in the first optical waveguide base layer 306 may get accumulated in a region 334 of the first optical waveguide 307, as depicted in FIG. 3. In particular, the region 334 is a portion of the first optical waveguide base layer 306 that form a part of the first optical waveguide 307.

In a similar fashion as described in FIG. 1, the accumulation of the free charge carriers, may cause a change (e.g., decrease) in the refractive index of the first optical waveguide 307. Due to the decrease in the refractive index, a wavelength of the light in the first optical waveguide 307 decreases which may cause a blue-shift in the light. Accordingly, a light passing through the second optical waveguide 309 may be attracted toward the first optical waveguide 307 and may enter into the first optical waveguide 307. The accumulation of the free charge carriers in the first optical waveguide 307, and hence the refractive index of the first optical waveguide 307, may be controlled by varying the voltages applied to the metal contacts 324, 326. Consequently, coupling of light from the second optical waveguide 309 to the first optical waveguide 307 may also be controlled based on the voltages applied to the metal contacts 324, 326.

In some examples, the second optical waveguide 309 may be operated in the depletion mode by applying the one or more second biasing voltages to the third metal contact 328 and the fourth metal contact 330 such that the free charge carriers are depleted from the second optical waveguide 309. By way of example, in the optical coupler 300 of FIG. 3, the second optical waveguide 309 may be operated in the depletion mode by applying a positive voltage to the fourth metal contact 330 and applying a negative voltage to the third metal contact 328 or grounding the third metal contact 328. Consequently, free charge carriers, e.g., free electrons from the portion 314 of the second optical waveguide base layer 308 may be depleted from a region 336 adjacent to a boundary between the second portion 322 of the semiconductor material layer 316. In particular, the region 336 is a portion of the second optical waveguide base layer 308 that forms a part of the second optical waveguide 309. Similarly, free charge carriers, e.g., free holes in the second portion 322 of the semiconductor material layer 316 may be depleted from a region 338 adjacent to the boundary between the second portion 322 of the semiconductor material layer 316, as depicted in FIG. 3. In particular, the region 338 is a portion of the semiconductor material layer 316 that forms a part of the second optical waveguide 309. As can be seen in FIG. 3, when the second optical waveguide 309 is operated in the depletion mode, the free charge carriers may be depleted on either side of the second insulating layer 310 in the second optical waveguide 309 as described hereinabove.

The depletion of the free charge carriers from the second optical waveguide 309 (e.g., from the portions 336 and 338) may cause a change (e.g., increase) in the refractive index of the second optical waveguide 309. Due to the increase in the refractive index, a wavelength of the light in the second optical waveguide 309 increases which may cause a redshift in light. Accordingly, the light passing through the second optical waveguide 309 may be directed toward the first optical waveguide 307 and may enter into the first optical waveguide 307. The depletion of the free charge carriers from the second optical waveguide 309, and hence the refractive index of the second optical waveguide 309, may be controlled by varying the voltages applied to the metal contacts 328, 330. Consequently, coupling of light from the second optical waveguide 309 to the first optical waveguide 307 may also be controlled based on the voltages applied to the metal contacts 328, 330.

In certain examples, the operation of the second optical waveguide 309 in the depletion mode while the first optical waveguide 307 is operating in the accumulation mode may further enhance the coupling effect of the light between the first optical waveguide 307 and the second optical waveguide 309. Such an enhanced coupling effect may be achieved because of increased difference in the refractive indexes of the first optical waveguide 307 and the second optical waveguide 309 that is caused due to the operation of the first optical waveguide 307 in the accumulation mode and the operation of the second optical waveguide 309 in the depletion mode.

Figure 4:
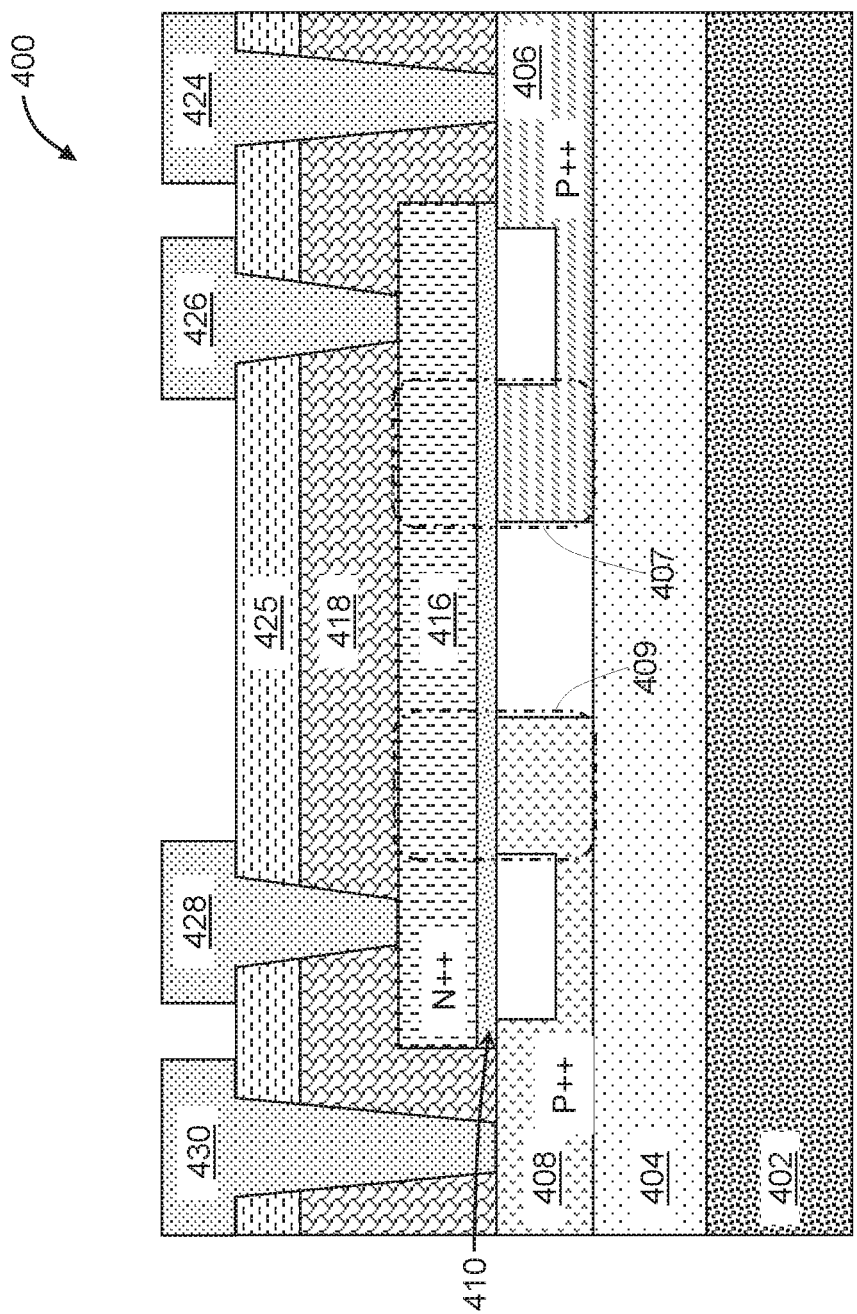
FIG. 4 depicts a diagrammatic representation of a cross-sectional view of an optical coupler, in accordance with another example.

Referring now to FIG. 4, a diagrammatic representation of a cross-sectional view of an optical coupler 400 is depicted, in accordance with another example. The optical coupler 400 of FIG. 4 may be representative of one example of the optical coupler 300 of FIG. 3 and the optical coupler 100 of FIG. 1. Accordingly, the optical coupler 400 includes certain material layers that are similar or identical to the ones described in FIGS. 1 and 3, description of which is not repeated herein. For example, the optical coupler 400 includes a substrate 402, a first insulating layer 404, a first optical waveguide base layer 406, a second optical waveguide base layer 408, a second insulating layer 410, a semiconductor material layer 416, a third insulating layer 418, and a bonding layer 425 that may represent examples of the substrate 102, the first insulating layer 104, the first optical waveguide base layer 106, the second optical waveguide base layer 108, the second insulating layer 110, the semiconductor material layer 116, the third insulating layer 118, and the bonding layer 125, respectively, of the optical coupler 100 of FIG. 1.

In the example of FIG. 4, both the first optical waveguide base layer 406 and the second optical waveguide base layer 408 are doped to include the first-type (e.g., p-type) doping, whereas the semiconductor material layer 316 may include the second-type (e.g., n-type) doping. Further, similar to the optical coupler 300, the optical coupler 400 may include additional metal contacts in comparison to the optical coupler 100 of FIG. 1. For example, the optical coupler 400 may include a plurality of metal contacts, such as, a first metal contact 424, a second metal contact 426, a third metal contact 428, and the fourth metal contact 430, hereinafter collectively referred to as metal contacts 424-430. As depicted in FIG. 4, the first metal contact 424 may be disposed in contact with the first optical waveguide base layer 406. Further, the second metal contact 426 may be disposed in contact with the semiconductor material layer 416 over the first optical waveguide base layer 406. Furthermore, the third metal contact 428 may be disposed in contact with the semiconductor material layer 416 over the second optical waveguide base layer 408. Moreover, the fourth metal contact 430 may be disposed in contact with the second optical waveguide base layer 408, as depicted in FIG. 4.

Further, the reference numerals 407 and 409 respectively represent a first optical waveguide and a second optical waveguide. For example, in a similar fashion as described with reference to FIG. 3, the first optical waveguide 407 is defined by the overlapping portions of the first optical waveguide base layer 406, the second insulating layer 410, and the semiconductor material layer 416. Similarly, the second optical waveguide 409 is defined by the overlapping portions of the second optical waveguide base layer 408, the second insulating layer 410, and the semiconductor material layer 416, as depicted in FIG. 4.

During operation, in a similar fashion as noted with respect to the optical coupler 300 of FIG. 3, the first optical waveguide 407 and the second optical waveguide 409 of the optical coupler 400 may also be operated in various combinations of an accumulation mode and a depletion mode to enhance the light coupling effect—details of which is not repeated herein. In particular, in the optical coupler 400, the first optical waveguide 407 may be operated in the accumulation mode by applying the one or more first biasing voltages to the first metal contact 424 and the second metal contact 426 such that the free charge carriers are accumulated in the first optical waveguide 407. By way of example, in the optical coupler 400 of FIG. 4, the first optical waveguide 407 may be operated in the accumulation mode by applying a positive voltage to the first metal contact 424 and applying a negative voltage to the second metal contact 426 or grounding the second metal contact 326. Further, in some examples, the second optical waveguide 409 may be operated in the depletion mode. In some examples, the second optical waveguide 409 may be operated in the depletion mode by applying the one or more second biasing voltages to the third metal contact 428 and the fourth metal contact 430 such that free charge carriers are depleted from the second optical waveguide 409. By way of example, in the optical coupler 400 of FIG. 4, the second optical waveguide 409 may be operated in the depletion mode by applying a negative voltage to the fourth metal contact 430 and applying a positive voltage to the third metal contact 428 or grounding the third metal contact 428.

Figure 5:
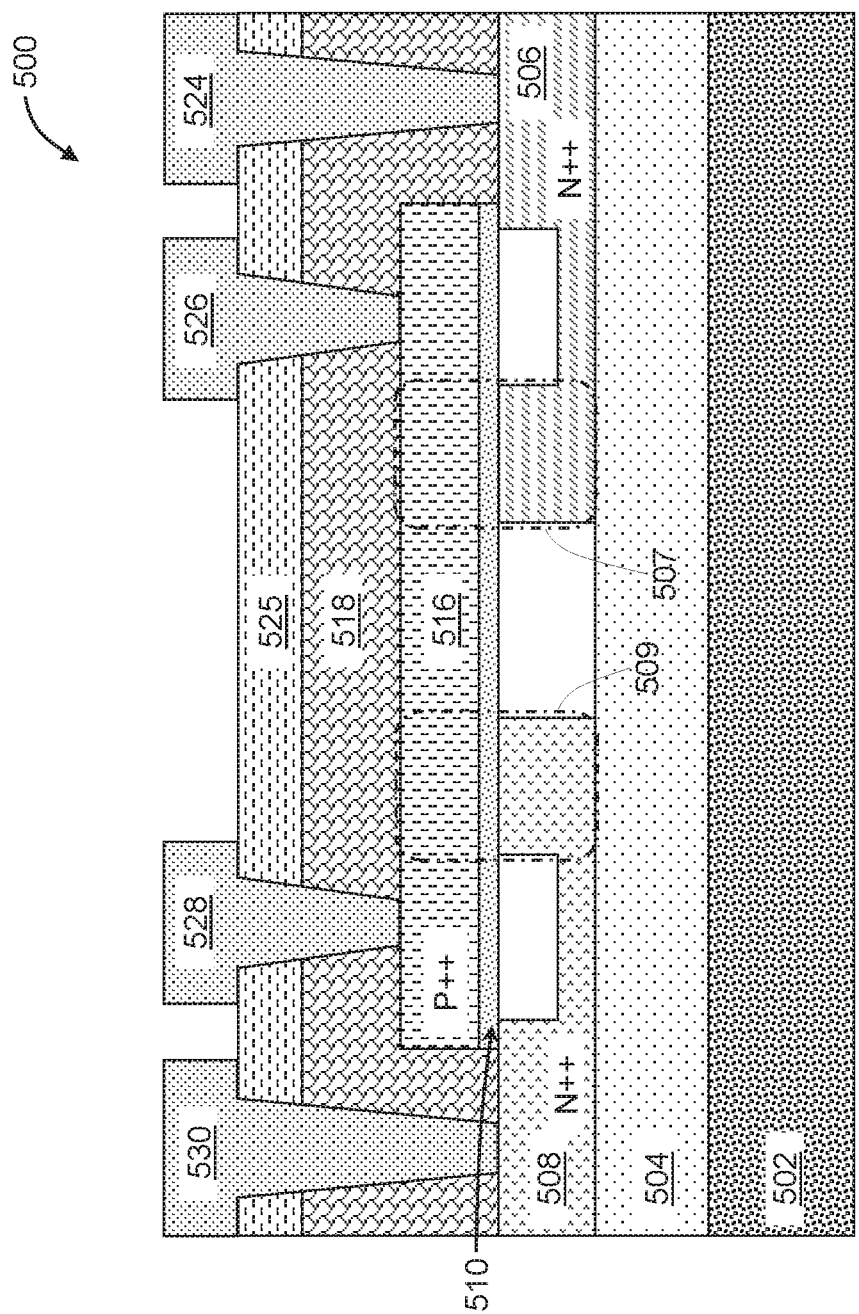
FIG. 5 depicts a diagrammatic representation of a cross-sectional view of an optical coupler, in accordance with yet another example.

Turning now to FIG. 5, a diagrammatic representation of a cross-sectional view of an optical coupler 500 is depicted, in accordance with another example. The optical coupler 500 of FIG. 5 may be representative of one example of the optical coupler 100, 300, or 400 described earlier and includes certain material layers that are similar or identical to the ones described in FIG. 4, description of which is not repeated herein. For example, the optical coupler 500 also includes a substrate 502, a first insulating layer 504, a first optical waveguide base layer 506, a second optical waveguide base layer 508, a second insulating layer 510, a semiconductor material layer 516, a third insulating layer 518, a bonding layer 525, and metal contacts 524-530 that may represent examples of the substrate 402, the first insulating layer 404, the first optical waveguide base layer 406, the second optical waveguide base layer 408, the second insulating layer 410, the semiconductor material layer 416, the third insulating layer 418, the bonding layer 425, and the metal contacts 424-430, respectively, of the optical coupler 400 of FIG. 4. In the example of FIG. 5, both the first optical waveguide base layer 506 and the second optical waveguide base layer 508 are doped to include the second-type (e.g., n-type) doping, whereas the semiconductor material layer 516 may include the first-type (e.g., p-type) doping.

Further, the reference numerals 507 and 509 respectively represent a first optical waveguide and a second optical waveguide. For example, in a similar fashion as described with reference to FIG. 3, the first optical waveguide 507 is defined by the overlapping portions of the first optical waveguide base layer 506, the second insulating layer 510, and the semiconductor material layer 516. Similarly, the second optical waveguide 509 is defined by the overlapping portions of the second optical waveguide base layer 508, the second insulating layer 510, and the semiconductor material layer 516, as depicted in FIG. 5.

During operation, in a similar fashion as noted with respect the optical coupler 300 of FIG. 3, the first optical waveguide 507 and the second optical waveguide 509 of the optical coupler 500 may also be operated in various combinations of an accumulation mode and a depletion mode to enhance the light coupling effect—details of which is not repeated herein. In particular, in the optical coupler 500, the first optical waveguide 507 may be operated in the accumulation mode by applying a negative voltage to the first metal contact 524 and applying a positive voltage to the second metal contact 526 or grounding the second metal contact 526 so that such that the free charge carriers are accumulated in the first optical waveguide 507. Further, in some examples, the second optical waveguide base layer 508 may be operated in the depletion mode by applying a positive voltage to the fourth metal contact 530 and applying a negative voltage to the third metal contact 528 or grounding the third metal contact 528 such that the free charge carriers are depleted from the second optical waveguide 509.

Figure 6:
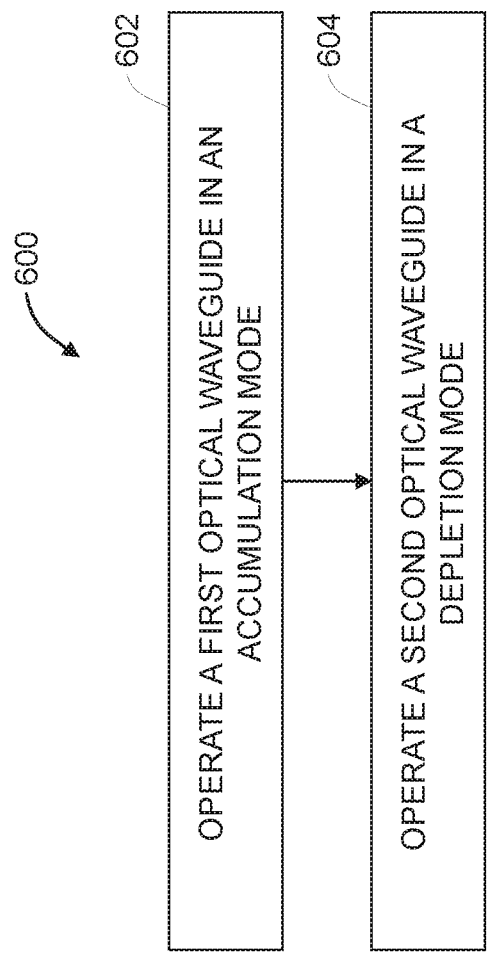
FIG. 6 depicts a flow diagram showing a method for operating an optical coupler, in accordance with one example.

Moving now to FIG. 6, a flow diagram showing a method 600 for operating an optical coupler is presented, in accordance with one example. For illustration purposes, the flow diagram of FIG. 6 is described with reference to the operation of the optical coupler 300 of FIG. 3. Other example optical couplers, such as, the optical couplers 400 and 500 may also be operated in a similar fashion with implementation specific application of biasing voltages.

In some examples, at block 602, the first optical waveguide 307 may be operated in an accumulation mode. In the optical coupler 300, the first optical waveguide 307 may be operated in the accumulation mode by applying a positive voltage to the first metal contact 324 and applying a negative voltage to the second metal contact 326 or grounding the second metal contact 326. Consequently, free electrons in the first portion 320 of the semiconductor material layer 316 may be accumulated in the region 332 over the portion 312 in the semiconductor material layer 116. Further, the free charge carriers, e.g., free holes in the first optical waveguide base layer 306 may get accumulated in the region 334 of the first optical waveguide base layer 306, as depicted in FIG. 3. Such accumulation of the free charge carriers in the first optical waveguide 307, may cause a decrease in the refractive index of the first optical waveguide 307. Due to the decrease in the refractive index, a wavelength of the light in the first optical waveguide 307 decreases which may cause a blue-shift in light. Accordingly, a light passing through the second optical waveguide 309 may be attracted toward the first optical waveguide 307 and may enter into the first optical waveguide 307.

Further, at block 604, the second optical waveguide 309 may be operated in a depletion mode. The second optical waveguide 309 may be operated in the depletion mode by applying a positive voltage to the fourth metal contact 330 and applying a negative voltage to the third metal contact 328 or grounding the third metal contact 328. Consequently, free electrons from the portion 314 of the second optical waveguide base layer 308 may be depleted from the region 336 adjacent to a boundary between the second portion 322 of the semiconductor material layer 316. Similarly, free holes in the second portion 322 of the semiconductor material layer 316 may be depleted from the region 338 adjacent to the boundary between the second portion 322 of the semiconductor material layer 316, as depicted in FIG. 3. Such depletion of the free charge carriers from the second optical waveguide 309, may cause an increase in the refractive index of the second optical waveguide 309. Due to the increase in the refractive index, a wavelength of the light in the second optical waveguide 309 increases which may cause a red-shift in light. Accordingly, the light passing through the second optical waveguide 309 may be directed toward the first optical waveguide 307 and may enter into the first optical waveguide 307. In certain examples, the operation of the second optical waveguide 309 in the depletion mode while the first optical waveguide 307 is operating on the accumulation mode may further enhance the coupling effect because of increased difference in the refractive indexes of the first optical waveguide 307 and the second optical waveguide 309.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. An optical coupler comprising:
    a first optical waveguide base layer and a second optical waveguide base layer, wherein at least one of the first optical waveguide base layer and the second optical waveguide base layer comprises a first-type doping;
    a gap between the first optical waveguide base layer and the second optical waveguide base layer;
    an insulating layer disposed directly and uninterruptedly over the gap and at least a portion of both the first optical waveguide base layer and the second optical waveguide base layer, the insulating layer disposed outside the gap;
    a semiconductor material layer disposed uninterruptedly over the insulating layer, wherein overlapping portions of the first optical waveguide base layer, the insulating layer, and the semiconductor material layer form a first optical waveguide, and wherein overlapping portions of the second optical waveguide base layer, the insulating layer, and the semiconductor material layer form a second optical waveguide, wherein the gap is configured for coupling light between the second optical waveguide and the first optical waveguide; and
    a plurality of metal contacts disposed in contact with the semiconductor material layer and at least one of the first optical waveguide base layer and the second optical waveguide base layer, and configured to receive one or more first biasing voltages to operate one of the first optical waveguide and the second optical waveguide in an accumulation mode.

2. The optical coupler of claim 1, wherein the first optical waveguide base layer and the second first optical waveguide base layer are disposed at a first predefined gap from each other over a first length and at a second predefined gap from each other over a second length.

3. The optical coupler of claim 1, wherein the semiconductor material layer comprises a second-type doping.

4. The optical coupler of claim 3, wherein the first-type doping is n-type doping and the second-type doping is p-type doping.

5. The optical coupler of claim 3, wherein the first-type doping is p-type doping and the second-type doping is n-type doping.

6. The optical coupler of claim 1, wherein the plurality of metal contacts comprises:
 a first metal contact disposed in contact with the first optical waveguide base layer; and
 a second metal contact disposed in contact with the semiconductor material layer.

7. The optical coupler of claim 6, wherein the first optical waveguide is operated in the accumulation mode by applying the one or more first biasing voltages to the first metal contact and the second metal contact such that free charge carriers are accumulated in the first optical waveguide.

8. The optical coupler of claim 1, wherein:
 the first optical waveguide base layer comprises the first-type doping;
 the second optical waveguide base layer comprises a second-type doping; and
 the semiconductor material layer comprises:
  a first portion comprising the second-type doping disposed over the first optical waveguide base layer; and
  a second portion comprising the first-type doping disposed over the second optical waveguide base layer.

9. The optical coupler of claim 8, wherein the plurality of metal contacts comprises:
 a first metal contact disposed in contact with the first optical waveguide base layer;
 a second metal contact disposed in contact with the first portion of the semiconductor material layer;
 a third metal contact disposed in contact with the second portion of the semiconductor material layer; and
 a fourth metal contact disposed in contact with the second optical waveguide base layer.

10. The optical coupler of claim 9, wherein the first optical waveguide is operated in the accumulation mode by applying the one or more first biasing voltages to the first metal contact and the second metal contact such that free charge carriers are accumulated in the first optical waveguide.

11. The optical coupler of claim 9, wherein the second optical waveguide is operated in a depletion mode by applying one or more second biasing voltages to the third metal contact and the fourth metal contact such that free charge carriers are depleted from the second optical waveguide.

12. The optical coupler of claim 1, wherein:
 both the first optical waveguide base layer and the second optical waveguide base layer comprise the first-type doping; and
 the semiconductor material layer comprises a second-type doping.

13. The optical coupler of claim 12, wherein the plurality of metal contacts comprises:
 a first metal contact disposed in contact with the first optical waveguide base layer;
 a second metal contact disposed in contact with the semiconductor material layer over the first optical waveguide base layer;
 a third metal contact disposed in contact with the semiconductor material layer over the second optical waveguide base layer; and
 a fourth metal contact disposed in contact with the second optical waveguide base layer.

14. The optical coupler of claim 13, wherein the first optical waveguide is operated in the accumulation mode by applying the one or more first biasing voltages to the first metal and the second metal contact such that free charge carriers are accumulated in the first optical waveguide.

15. The optical coupler of claim 13, wherein the second optical waveguide is operated in a depletion mode by applying one or more second biasing voltages to the third metal contact and the fourth metal contact such that free charge carriers are depleted from the second optical waveguide.

16. An optical coupler comprising:
 a first optical waveguide base layer and a second optical waveguide base layer, wherein the first optical waveguide base layer comprises a first-type doping and the second optical waveguide base layer comprises a second-type doping;
 a gap between the first optical waveguide base layer and the second optical waveguide base layer;
 an insulating layer disposed directly and uninterruptedly over the gap and at least a portion of both the first optical waveguide base layer and the second optical waveguide base layer, the insulating layer disposed outside the gap;
 a semiconductor material layer disposed uninterruptedly over the insulating layer and comprising a first portion disposed over the first optical waveguide base layer and a second portion disposed over the second optical waveguide base layer, wherein the first portion comprises the second-type doping and the second portion comprises the first type-doping, wherein overlapping portions of the first optical waveguide base layer, the insulating layer, and the semiconductor material layer form a first optical waveguide, and wherein overlapping portions of the second optical waveguide base layer, the insulating layer, and the semiconductor material layer form a second optical waveguide, wherein the gap is configured for coupling light between the second optical waveguide and the first optical waveguide; and
 a plurality of metal contacts disposed in contact with one or more of the semiconductor material layer, the first optical waveguide base layer, and the second optical waveguide base layer, and configured to receive one or more biasing voltages to operate the first optical waveguide in an accumulation mode and operate the second optical waveguide in a depletion mode.

17. The optical coupler of claim 16, wherein the plurality of metal contacts comprises:
 a first metal contact disposed in contact with the first optical waveguide base layer;
 a second metal contact disposed in contact with the first portion of the semiconductor material layer;
 a third metal contact disposed in contact with the second portion of the semiconductor material layer; and
 a fourth metal contact disposed in contact with the second optical waveguide base layer.

18. A method for operating an optical coupler, comprising:
 operating a first optical waveguide in an accumulation mode; and
 operating a second optical waveguide in a depletion mode, wherein the optical coupler comprises: a first optical waveguide base layer comprising a first-type doping, a second optical waveguide base layer comprising a second-type doping, a gap between the first optical waveguide base layer and the second optical waveguide base layer, an insulating layer disposed directly and uninterruptedly over the gap and at least a portion of both the first optical waveguide base layer and the second optical waveguide base layer, the insulating layer disposed outside the gap, a semiconductor material layer disposed uninterruptedly over the insulating layer and comprising a first portion with the second-type doping disposed over the first optical waveguide base layer and a second portion with the first-type doping disposed over the second optical waveguide base layer, and a plurality of metal contacts disposed in contact with the semiconductor material layer, the first optical waveguide base layer and the second optical waveguide base layer, wherein overlapping portions of the first optical waveguide base layer, the insulating layer, and the semiconductor material layer form the first optical waveguide, and wherein overlapping portions of the second optical waveguide base layer, the insulating layer, and the semiconductor material layer form the second optical waveguide, wherein the gap is configured for coupling light between the second optical waveguide and the first optical waveguide, wherein operating the first optical waveguide in the accumulation mode and operating the second optical waveguide in the depletion mode comprises applying biasing voltages on the plurality of metal contacts, and wherein coupling of light between the second optical waveguide and the first optical waveguide is increased based on the applied biasing of voltages on the plurality of metal contacts.

19. The method of claim 18, wherein the plurality of metal contacts comprises: a first metal contact disposed in contact with the first optical waveguide base layer; a second metal contact disposed in contact with the first portion of the semiconductor material layer; a third metal contact disposed in contact with the second portion of the semiconductor material layer; and a fourth metal contact disposed in contact with the second optical waveguide base layer, wherein operating the first optical waveguide in the accumulation mode comprises applying one or more first biasing voltages to the first metal and the second metal contact such that free charge carriers are accumulated in the first optical waveguide.

20. The method of claim 19, wherein operating the second optical waveguide base layer in the depletion mode comprises applying one or more second biasing voltages to the third metal contact and the fourth metal contact such that charge carriers are depleted from the second optical waveguide.

* * * * *